United States Patent [19]
Raubenheimer

[11] 3,753,659
[45] Aug. 21, 1973

[54] DOSING OF LIQUIDS

[76] Inventor: Johann Nicolaas Raubenheimer, Bedfordview, Republic of South Africa

[22] Filed: Mar. 2, 1971

[21] Appl. No.: 120,244

[30] Foreign Application Priority Data
Mar. 2, 1970 South Africa............................ 1366

[52] U.S. Cl................ 23/267 A, 4/172, 137/268, 141/392, 222/54
[51] Int. Cl.. B01d 11/02, B01d 15/02, B01d 59/24, E03d 3/16, E03d 3/18
[58] Field of Search....................... 4/222, 227, 228; 9/8 R, 8.5; 23/267 A, 282; 137/268, 236; 141/392; 210/62, 169, 242; 222/54

[56] References Cited
UNITED STATES PATENTS

| | | | |
|---|---|---|---|
| 451,344 | 4/1891 | Taylor.................................. | 4/228 |
| 2,667,646 | 2/1954 | Monteiro............................... | 4/228 |
| 2,976,129 | 3/1961 | Buehler................................ | 23/267 A |
| 3,289,415 | 12/1966 | Merrill................................ | 137/236 X |
| 3,409,055 | 11/1968 | Bily.................................... | 137/236 X |
| 3,607,103 | 9/1971 | Kiefer.................................. | 23/267 A |

FOREIGN PATENTS OR APPLICATIONS
| | | | |
|---|---|---|---|
| 710,796 | 6/1954 | Great Britain......................... | 4/228 |

Primary Examiner—Henry K. Artis
Attorney—Lilling & Siegel

[57] ABSTRACT

This invention concerns an apparatus for dosing liquids especially swimming pool water. The apparatus comprises a container for dosing liquid having an outlet as the only open part therefrom and means for enabling the container to be surrounded by liquid to be dosed. The container may be a transparent container immersed in the liquid to be dosed.

8 Claims, 4 Drawing Figures

Patented Aug. 21, 1973

3,753,659

DOSING OF LIQUIDS

DESCRIPTION OF INVENTION

This invention relates to improvements in the dosing of liquids.

The present invention provides an apparatus for use in dosing liquids, which comprises a container adapted to contain a dosing liquid, the container either having an outlet and no separate open inlet for liquid, or having an outlet and a closeable inlet, the container further having means to enable the container to be surrounded by liquid to be dosed.

The invention also provides a method of dosing liquids which comprise surrounding a container containing dosing liquid with liquid to be dosed, the dosing liquid being adapted to evolve a gas on receiving solar energy, and permitting the dosing liquid to mix with the liquid to be dosed at a rate which is dependent on the solar energy reaching the dosing liquid, the said container either having an outlet and no separate inlet for liquid or having an outlet and a closeable inlet.

The invention is particularly suitable for treating water in swimming pools, and reservoirs of potable water, with a view to preventing algae formation. For this purpose a dosage material can be caused to dissolve in the water in an amount dependent on the solar energy reaching the water. Any of the usual dosage materials which evolve a gas under the action of sunlight, (for example, calcium hypochlorite, sodium hypochlorite, or a halogenated cyanurate compound) can be used.

In one embodiment, the means for enabling the container to be surrounded by liquid comprises a weight adapted to immerse the container wholly within the liquid to be dosed. Conveniently, the weight can be suspended centrally below the container. In this embodiment, the container can be partly or completely transparent to enable light to reach the interior. If desired, light-impervious blinds may be provided around the container, the position of these blinds being adjustable so that the amount of light reaching the interior of the container may be altered.

The weight may be so calculated that the container will sink in the liquid to be dosed when the container contains dosing liquid, or a soluble substance which gives dosing liquid on dissolution, and will float when it requires recharging.

The container may be a double domed separable container. It may have an outlet at its lower end, which outlet points in an upward direction, and a closeable inlet at its upper end. The inlet may be a float which is adapted normally to close the inlet.

Alternatively, the container may have a single outlet for dosing liquid terminating in a tray positioned on the container, and no separate inlet. The outlet may be an axial tube leading upwardly from a lower part of the container.

The tray may have holes around its edge to act as a filter while the dosing liquid passes through.

The dosing liquid can be formed on dissolution of a solid dosage material in the container. The dosage material may be positioned on a filter septum which is resistant to attack.

In the embodiments described above, the dosage material is or contains a substance which evolves gas under action of sunlight (and if necessary in the presence of the solvent). With these embodiments, the gas formed under the action of sunlight goes to the top of the container where it causes some of the liquid present in the container to be forced out through the outlet. The liquid may be water. When the container contains an inlet closed by a float, this drops with the liquid level to admit fresh liquid. In all cases, the amount of solution forced out from the container is increased as the solar energy reaching the inside of the container is increased, since an increased amount of gas is evolved. Thus, the rate of evolution of gas (under the action of sunlight) governs the amount of solution passing out from the container.

In another embodiment, the means for enabling the container to be surrounded by liquid to be dosed comprises an outer shell around the container, said outer shell having inlet and outlet means for the liquid to be dosed. The container and outer shell both may be at least partly transparent. Conveniently, the apparatus has an outlet pipe and no open inlet, the outlet pipe leading to a U-tube containing mercury adapted to make electrical contact across a pair of electrodes when gas pressure therein exceeds a predetermined value, the outlet pipe further including a pressure release valve adapted to open after the mercury has made the electrical contact.

This embodiment is particularly suitable as a monitoring device for dosing the liquid. A sample of the liquid to be dosed (e.g. water in a swimming pool) passes between the shell and the container which can contain a strong solution of dosing liquid. (e.g. sodium hypochlorite solution). By continuously renewing the sample of liquid (conveniently by by-passing a small quantity of wacxr from the pool's filtration system) the solution within the container is maintained at a temperature closely approximately that of the liquid to be dosed. The oxygen evolved will cause the mercury to complete the electrical circuit and actuate a solenoid-operated valve within the circuit. The solenoid-operated valve allows the oxygen to escape. Also actuated in the circuit is a further solenoid valve which permits a strong solution of dosing material to enter the pool.

When dosing with a hologen-containing substance, I have found that temperature, as well as sunlight, determines both the rate of formation of the oxygen and the rate of consumption of free hologen in water. The dosing material may conveniently be bottled gaseous chlorine. If the rate of formation of the oxygen in the monitoring device is increased, either by more sunlight or by a rise in the temperature of the liquid sample, an increased quantity of dosing material will enter the pool over a period, since a shorter time will elapse between successive pulses of electricity from the monitor.

Some preferred embodiments of the invention are illustrated in the accompanying drawings, in which.

Figure 1:
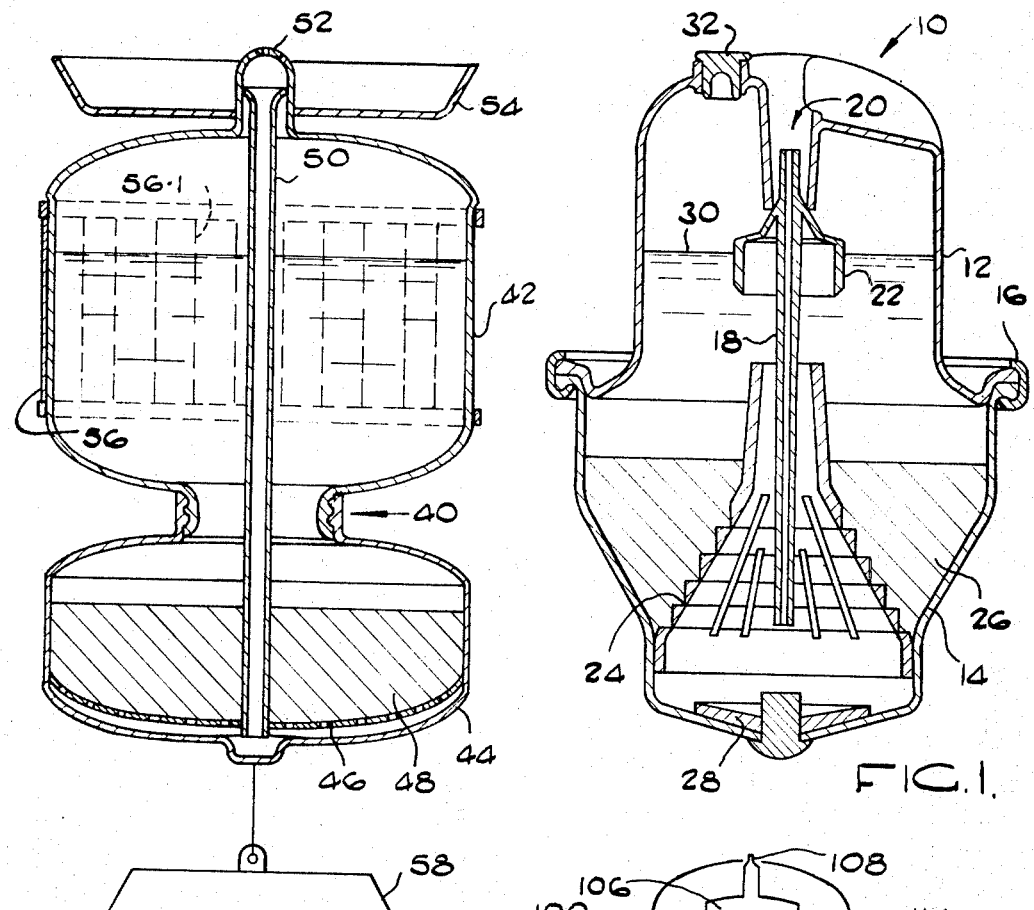
FIG. 1 is a cross-section through one embodiment.

Referring to FIG. 1, a transparent container shown generally at 10 is formed from an upper dome 12 and a lower dome 14 connected together by ring 16. An outlet tube 18 extends from near the bottom of the container to an opening 20 in the top of the tube upper dome. A float 22 is fast with tyhetube 18 towards the upper end and, under normal conditions, effectively closes the opening 20. A perforated percolator 24 is situated in the lower dome 14 and supports solid calcium hypochlorite treating material 26. Ballast 28 below the percolator ensures that the container will sink when in a swimming pool. The container is filled with calcium hypochlorite through plug 32.

The container is held under water in the pool until sufficient water has entered and air has been displaced, through 20 for it to sink to the bottom of the pool. Further water enters through 20 until level 30 is reached when the float rises sufficiently to prevent further escape of air.

Figure 2:
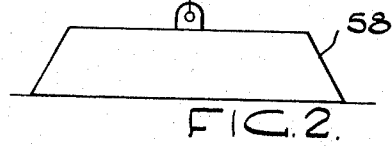
FIG. 2 is a cross-section through a second embodiment.

In the embodiment of FIG. 2, a transparent container 40 has upper and lower domes 42, 44. A filter septum 46 extends across the lower dome 44 and supports solid calcium hypochlorite treating material 48. An outlet tube 50 extends from the bottom of the lower dome to jets 52 in the top of the upper dome. A tray 54 acts as a cup around the container initially to collect liquid which passes out through the jets. A plurality of adjustable blinds 56, 56.1 etc., are positioned around the upper dome 42. The container is weighted by weight 58.

Figure 3:
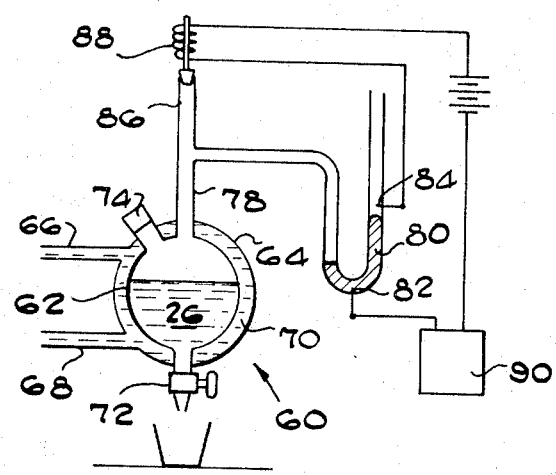
FIG. 3 is a schematic view of a metering device.

In FIG. 3, a monitoring device 60 comprises an upper transparent container 62 surrounded by an outer transparent shell 64. Water from a swimming pool is circulated by pipes 66, 68 into space 70 between the shell 64 and the container 62. The container has a closed drain tap 72, a closed inlet 74 for concentrated aqueous sodium hypochlorite solution 76 and an outlet 78. The outlet incorporates a side tube having a U-portion containing mercury 80 and electrical contacts 82, 84. The upwardly directed part 86 of the outlet 78 is closed by a solenoid operated release valve 88. An electrical circuit utilises contacts 82, 84 and the mercury as a switch. The solenoid of valve 88 is in the circuit, as is a solenoid-operated valve (not shown) of chlorine supply means shown generally at 90. Sunlight reaching the sodium hypochlorite solution 76 causes oxygen to be evolved which forces the mercury to complete the electrical circuit across the contacts 82, 84. A low voltage then flows in the circuit to open solenoid-operated valve 88 and release the oxygen pressure (the mercury level then returning to normal) as well as opening the solenoid valve of the chlorine supply means to release a concentrated solution of a hypochlorite into the pool.

Figure 4:
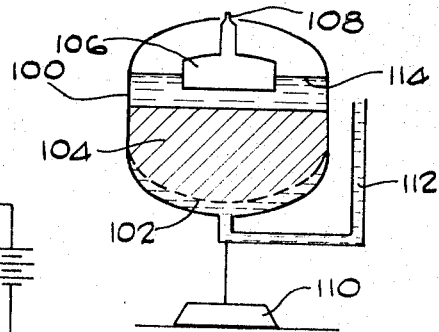
FIG. 4 is a cross-sectional view through a further embodiment.

The device in FIG. 4 has a container 100 with a filter septum 102 across it supporting solid calcium hypochlorite 104. The container has water in it, and float 106 normally closes inlet 108. The device is submerged in a swimming pool and weighted down by weight 110. Outlet 112 is open to the pool. The action of sunlight causes oxygen to be evolved, which rises above water level 114, forcing it down and concentrated hypochlorite solution out of the outlet. The float 106 drops and lets in pool water until the inlet 108 is closed again.

In all the embodiments shown, the rate of dosing is dependent on the sunlight reaching the dosing solution. I have found that calcium hypochlorite conveniently can be used to provide the dosing solution, and has the advantage of being cheap. The calcium hypochlorite solid gives a yellow solution which is distributed over the pool, thus substantially avoiding staining which can occur when a solid pool chemical is added to a pool. Other dosing materials which evolve oxygen under the action of sunlight may be used.

Sunlight is the main factor affecting chlorine loss from a pool. With the present invention, the chlorine content lost can be replaced by a proportional amount. Thus, there will be substantially no wastage of the dosage material since the aqueous solution thereof practically only is supplied to the pool when the sun shines. In a test in the Transvaal, a chlorinator in accordance with the invention, and which is governed by oxygen generation, resulted a near constant level of chlorine (in parts per million) in the pool at all times of the day and night, even though the loss of chlorine from the pool during daylight hours was about 5.8 times the night loss. A considerable saving in costs was thereby achieved.

I claim:

1. An apparatus for dosing water with a dosing liquid which evolves a gas under the action of sunlight, said apparatus comprising an at least partially transparent container for containing dosing liquid, the container when in use being closed apart from a permanently open outlet for the exit of dosing liquid and an inlet through which the water can pass into the container, a float adapted to float on the dosing liquid and to close the inlet against the entry of water when the volume of liquid in the container reaches a predetermined level, the permanently open outlet comprising an upwardly-extending pipe leading from near the bottom of the interior of the container to the exterior thereof, and weight means for maintaining the container and its contents with the outlet below the water level.

2. An apparatus according to claim 1, wherein a perforated support for solid dosing material, capable of being dissolved to form the dosing liquid, is provided within the container above the bottom thereof.

3. An apparatus according to claim 2, wherein the upwardly-extending pipe leads upwardly from below the perforated support to the exterior of the container.

4. An apparatus according to claim 1, wherein the upwardly-extending pipe passes through the inlet and the float is provided as an annular float around the upwardly-extending pipe and adapted to close the inlet.

5. An apparatus for chlorinating a swimming pool with an aqueous hypochlorite solution, said apparatus comprising an at least partially transparent container for containing a said hypochlorite and hypochlorite solution, the container when in use being closed apart from a permanently open outlet for the exit of hypochlorite solution and an inlet through which water from the pool can pass into the container, a float adapted to float on the hypochlorite solution in the container and to close the inlet against the entry of water when the volume of hypochlorite solution in the container reaches a predetermined level, the permanently open outlet comprising an upwardly extending pipe leading from near the bottom of the interior of the container to the exterior thereof, and weight means for maintaining the container, solid hypochlorite and hypochlorite solution with the outlet below the level of water in the swimming pool.

6. An apparatus according to claim 5, wherein the solid hypochlorite is provided on a perforated support above the bottom of the container.

7. An apparatus according to claim 6, wherein the upwardly-extending pipe leads upwardly from below the support to the exterior of thee container.

8. An apparatus according to claim 7, wherein the upwardly-extending pipe passes through the water inlet and the float is provided as an annular float around the upwardly-extending pipe.

* * * * *